United States Patent [19]

Dean

[11] Patent Number: 4,939,108

[45] Date of Patent: Jul. 3, 1990

[54] PROCESS FOR PRODUCING DIELECTRIC CERAMIC COMPOSITION WITH HIGH DIELECTRIC CONSTANT, LOW DISSIPATION FACTOR AND FLAT TC CHARACTERISTICS

[75] Inventor: Terrence C. Dean, Youngstown, N.Y.

[73] Assignee: TAM Ceramics, Inc., Niagara Falls, N.Y.

[21] Appl. No.: 266,433

[22] Filed: Nov. 2, 1988

Related U.S. Application Data

[63] Continuation of Ser. No. 926,595, Nov. 3, 1986, abandoned.

[51] Int. Cl.[5] .................. C04B 35/46; C04B 35/48
[52] U.S. Cl. .................................. 501/137; 501/138; 501/139; 252/520; 252/521
[58] Field of Search ...................... 501/137, 138, 139; 252/62.9, 520, 521; 264/60

[56] References Cited

U.S. PATENT DOCUMENTS

| | | | |
|---|---|---|---|
| 3,642,527 | 2/1972 | Purdes et al. | 117/212 |
| 3,754,987 | 8/1973 | Purdes | 117/212 |
| 3,983,077 | 9/1976 | Fuller et al. | 252/520 |
| 4,005,050 | 1/1977 | Stewart et al. | 252/521 |
| 4,054,531 | 10/1977 | Takahashi et al. | 252/63.2 |
| 4,093,450 | 6/1978 | Doyle et al. | 75/119 |
| 4,233,282 | 11/1980 | Arendt | 423/598 |
| 4,234,436 | 11/1980 | Arendt et al. | 252/62.9 |
| 4,234,557 | 11/1980 | Arendt et al. | 423/593 |
| 4,395,278 | 7/1983 | Vanderpool et al. | 423/592 |
| 4,487,755 | 12/1984 | Arendt | 423/598 |
| 4,534,956 | 8/1985 | Arendt et al. | 423/598 |
| 4,537,865 | 8/1985 | Okaba et al. | 501/135 |
| 4,643,984 | 2/1987 | Abe et al. | 501/134 |

FOREIGN PATENT DOCUMENTS

| | | |
|---|---|---|
| 58-15078 | 1/1983 | Japan . |
| 58-28103 | 2/1983 | Japan . |
| 59-20905 | 2/1984 | Japan . |
| 59-63605 | 4/1984 | Japan . |
| 1527060 | 10/1978 | United Kingdom . |

OTHER PUBLICATIONS

Kahn, M. "Preparation of Small-Grained and Large-Grained Ceramics from Nb-Doped BaTiO$_3$" *J. Am. Ceramics Soc.*, 54 (9), Sep. 1971, pp. 452–454.

Brown, L. et al., "Synthesis of Nb$_2$O$_5$-Doped BaTiO$_3$ with Improved Electrical Properties" *J. Am. Ceramics Soc.*, 55, Dec. 1972, 633–634.

*Primary Examiner*—Brian E. Hearn
*Assistant Examiner*—Andrew Griffis
*Attorney, Agent, or Firm*—Kenyon & Kenyon

[57] ABSTRACT

The present invention provides ceramic compositions for preparing multi-layer capacitors, having high dielectric constants between about 4900 and 5400, dissipation factors below about 2.0%, high insulation resistance capacitance products and stable temperature coefficient characteristics, by a process of mixing a major oxide component with one or more precipitated dopant components.

9 Claims, No Drawings

PROCESS FOR PRODUCING DIELECTRIC CERAMIC COMPOSITION WITH HIGH DIELECTRIC CONSTANT, LOW DISSIPATION FACTOR AND FLAT TC CHARACTERISTICS

This is a continuation of application Ser. No. 926,595 filed Nov. 3, 1986, now abandoned.

BACKGROUND OF THE INVENTION

The present invention relates to ceramic dielectric compositions which have high dielectric constants (K), e.g., between about 4900 and about 5400; low dissipation factors (DF), e.g., below about 2%; high insulation resistance (R) capacitance (C) products (RC), e.g., above about 7000 ohm-farads at 25° C. and above about 3000 ohm-farads at 125° C.; and stable temperature coefficient (TC) characteristics in which the dielectric constant does not alter from its base value at 25° C. by more than about plus or minus 15% over a temperature range from −55° C. to 125° C.

Multilayer ceramic capacitors (MLCS) are commonly made by casting or otherwise forming insulating layers of dielectric ceramic powder; placing thereupon conducting metal electrode layers, usually a paladium/silver alloy in the form of metallic paste; stacking the resulting elements to form the multilayer capacitor; and firing to densify the material thus forming a multilayer ceramic capacitor. Other processes for forming MLCS are described in U.S. Pat. Nos. 3,697,950 and 3,879,645.

A high dielectric constant is important, because it allows a manufacturer to build smaller capacitors for a given capacitance. The electrical properties of many dielectric ceramic compositions may vary substantially as the temperature increases or decreases, however, and the variation of the dielectric constant and the insulation resistance with temperature and the dissipation factor, are also important factors to be considered in preparing ceramic compositions for use in multilayer capacitors.

In a desirable dielectric ceramic composition for use in a multilayer capacitor for applications requiring stability in the dielectric constant over a wide temperature range, the dielectric constant does not change from its base value at 25° C. (room temperature) by more than about plus or minus 15%. The insulation resistance and capacitance product of such a composition should be more than 1000 ohm-farads at 25° C. and more than 100 ohm-farads at maximum working temperature, 125° C. in most cases. In addition, the dissipation factor should be as close to 0% as possible.

The method commonly used to produce such temperature stable capacitors consist of firing $BaTiO_3$, used because of its high dielectric constant, together with minor ceramic oxide additives (dopants) which comprise minor amounts of elements or compounds which control the final dielectric properties. The degree of distribution of the ceramic oxide dopants throughout the barium titanate in the unfired state will determine such things as the extent of solid solution development during firing, grain growth, and the composition of the final fired grain and grain boundary. Thus, the efficiency of mixing is a key factor in the process to achieve the desired electrical properties in the finished multilayer ceramic capacitor. Until the present invention, however, the very minor amounts of ceramic oxide dopants have been very difficult to distribute in a homogeneous fashion throughout the blended ceramic dielectric composition.

It is well known that, in order for compositional development to take place during the firing stage of the manufacture of a multilayer ceramic capacitor, the particles of the ceramic oxide dopants of a dielectric composition must be in finely divided form to ensure adequate mixing of the ceramic oxide dopants with the $BaTiO_3$. Ideally, in order for complete compositional development to take place during sintering of the ceramic dielectric composition, it is understood that the minor components must disperse themselves such that the environment around each barium titanate grain is the same throughout the bulk of the composition and such that the environment within each barium titanate grain is the same throughout the bulk of the composition. Typically, this is attempted by milling the components of the composition to a particle size of approximately 1 micron. Homogeneous distribution will be enhanced, however, by introducing ceramic oxide dopants of a smaller particle size, e.g., approximately 0.1 micron while continuing to use $BaTiO_3$ particles of 1.0 micron in size. By way of illustration, using uniformly distributed powders of approximately 1 micron in spherical shape, it can be calculated that a unit of mix, prepared according to the proportions disclosed in the present invention, would contain 400 particles of barium titanate, 5 particles of niobium pentoxide and 1 particle of cobalt oxide. If, however, barium titanate powder of approximately 1.0 micron average particle size is mixed with niobium pentoxide and cobalt oxide of approximately 0.1 micron particle size, and assuming that these particles are perfectly spherical and uniformly distributed, it can be calculated that a unit of mix would contain 400 particles of barium titanate, 5000 particles of niobium pentoxide and 1000 particles of cobalt oxide. Thus each barium titanate particle would be surrounded by approximately thirteen niobium pentoxide particles and 3 cobalt oxide particles. It would therefore be expected that compositional development during sintering would occur much more efficiently and the effectiveness of the ceramic oxide dopant additives would be greatly enhanced compared to that achieved by mixing 1 micron particles of the minor components.

It is well known in the art that ceramic oxide particles can be reduced in size to about 1 micron by milling techniques. Before the present invention, however, it has been impossible to produce finely divided powders of the order of 0.1 microns because these milling techniques incur the risk of increasing the contamination levels of undesirable species, present in the milling media, and because milling efficiencies are significantly reduced as the particle size of the powder reaches submicron levels. The process described in this invention provides a means of enhancing the uniformity of the distribution of the minor component dopants in the ceramic mixture before firing, and thus enhancing the compositional development during sintering, by precipitating the minor component dopants in a finely divided form of approximately 0.1 micron average particle size in a controlled manner.

The process described in this invention has the advantage of producing ceramic oxide particles of the order of 0.1 microns without the problems associated with current milling techniques.

A second advantage of the process is the production of ceramic dielectric compositions with improved electrical properties, i.e., higher dielectric constants, lower dissipation factors and higher insulation resistance capacitance products than those processed by conventional mixing techniques. The higher dielectric constant achieved as a result of this process has the important advantage of allowing capacitor manufacturing companies to produce multilayer ceramic capacitors with higher capacitance values for a given chip size, or the same capacitance values at a reduced chip size, given that the number of active insulating layers and the thickness of each insulating layer are constants. The benefits are thus reduced cost and/or miniaturization.

SUMMARY OF THE INVENTION

It is an object of the present invention to produce a ceramic composition having a dielectric constant between about 4900 and about 5400 at 25° C., a dissipation factor less than about 2.0%, and a stable temperature coefficient in which the dielectric constant does not vary by more than about plus or minus 15% from its reference value at 25° C.

It is another object of the present invention to produce a ceramic composition suitable for manufacturing multilayer ceramic capacitors using precious metal internal electrodes and having a dielectric constant between about 4900 and 5400 at 25° C., a dissipation factor of less than 2.0% and insulation resistance capacitance product of more than 7000 ohm farads at 25° C. and more than 3000 ohm farad at 125° C., and also having a stable TC characteristic in which the dielectric constant does not vary more than about plus or minus 15% from its reference value at 25° C.

The above stated objects are achieved by the present invention, which provides a process for producing a ceramic composition having high dielectric constant, low dissipation factor, and stable TC characteristics including a major component, preferably comprising high purity barium titanate, and one or more minor component dopants, preferably comprising niobium pentoxide and cobalt oxide, wherein the niobium pentoxide dopant must be, and the cobalt oxide dopant may be, precipitated to provide the small particles of the present invention. Dielectric ceramic compositions chosen for processing according to this invention contain the major component preferably barium titanate, which comprises from about 98.5 to about 98.8 per cent by weight and the minor component dopants, preferably niobium pentoxide and cobalt oxide, which comprise from about 1.0 to about 1.1 per cent by weight and from about 0.2 to about 0.3 per cent by weight respectively.

The process described in this invention provides a method for making a dielectric ceramic having dopant particles uniformly dispersed therein comprising: dispersing major component particles in a liquid medium; precipitating dopant particles from a liquid medium containing precursors of the dispersing dopant particles the dopant particles throughout the major component particles so that the dopant particles are associated in a relatively uniform manner with the major component particles; removing the liquid medium; and sintering.

The invention also provides a dielectric ceramic comprising: a sintered mass of precipitated dopant particles dispersed throughout major component particles such that the dopant particles are associated with the major component particles.

The invention also provides a multilayer ceramic capacitor comprising: a plurality of dielectric ceramic layers wherein the dielectric ceramic comprises precipitated dopant particles associated with major component particles such that the dopant particles are in fixed proportion to the major component particles and such that the dielectric ceramic, when fired, has a dielectric constant between about 4900 and 5400, a dissipation factor of below about 2.0%, an insulation resistance capacitance product above about 7000 ohm-farads at 25° C. and above about 3000 ohm-farads at 125° C. and a temperature stable temperature coefficient (hereafter TC) in which the dielectric constant does not vary more than plus or minus 15% from its value at 25° C. over the temperature range from −55° C. to 125° C.; and a plurality of electrodes between the dielectric layers.

It will be understood by those skilled in the art that the term dopant precursor as used herein means the species of dopant or dopant ion present in the liquid medium prior to the precipitation step.

DETAILED DESCRIPTION OF THE INVENTION

As set forth below, the method of producing a ceramic dielectric composition of the present invention has several advantages which result in substantial technological advancement and cost savings while enhancing desirable physical and electrical properties.

The present invention provides a novel method of producing a dielectric composition having a dielectric constant between 4900 and 5400, a dissipation factor of less than 2.0%, and with stable TC characteristics. This process differs substantially from those disclosed in the prior art in which conventional mixing techniques are used and in which desirable dielectric properties, such as a higher dielectric constant, are sacrificed in order to obtain materials which have stable TC characteristics. Because conventional processes produce materials with dielectric constants not more than about 3000 to about 4700, by the use of the process of the current invention, which achieves higher dielectric constants, it is possible to produce multilayer ceramic capacitors with significantly higher capacitance values under the same physical size restriction or the smallest possible physical size under the same capacitance restriction. The higher dielectric constants also result in using significantly less ceramic and electrode material, and thus the manufacturing cost can be significantly reduced by using the process described in the current invention.

The process described in this invention provides a means for enhancing the uniformity of the distribution of the dopants in the ceramic mixture before firing by using major component powder of approximately 1.0 micron average particle size, and by precipitating one or both of the dopants in a finely divided form, approximately 0.1 micron average particle size, in a controlled manner. The compositional development during sintering occurs more efficiently because of increased homogeneity of the mixture and the effectiveness of the dopant additives is greatly enhanced compared to that achieved by mixing 1.0 micron particles of the dopants.

The process of the invention involves precipitating a dopant from a liquid medium and mixing the precipitated dopant with a slurry of the major component such that the dopant particles are uniformly dispersed throughout the major component particles.

In a preferred embodiment, the major component of the ceramic composition is slurried in liquid media followed by the addition of a precise amount of a solution containing a precursor of a dopant. Alternatively, the major component can be slurried in a solution containing a precursor of a dopant. The dopant is then precipitated from the solution in a finely divided form in a controlled manner such that intimate contact between the major component particles and the dopant is achieved This procedure can be used to introduce one or more dopants. The major component is preferably chosen from the group of perovskite forming metal oxides.

In an especially preferred embodiment, the major component is barium titanate ($BaTiO_3$), which is slurried in water and the two dopants are niobium pentoxide and cobalt oxide. In this embodiment the niobium pentoxide is precipitated in the presence of the barium titanate, while the cobalt oxide may be introduced to the slurry either in powder form or as a precipitate. The precursor solution of niobium pentoxide is a solution of niobium pentachloride in ethanol and the niobium pentoxide is precipitated with concentrated ammonium hydroxide.

Following filtration and washing, the intimate mixture of components may be mixed with a suitable binder composition; cast into a sheet using standard methods; formed into a multilayer capacitor structure with internal electrodes such as 70% paladium/30% silver; and fired at about 1280° C. to about 1350° C. for about 2 hours. Any conventional ceramic binder composition; which is compatible with the other materials used and which simply provides a vehicle for dispersing the ceramic particles and holding them together when the solvent is removed, may be used with this invention. Suitable binder compositions are described in "Ceramic Process Before Firing", G. Y. Onoda Jr., et al. John Wiley and Sons (1978) chapter 19. Corn syrup and polyvinyl alcohol are examples of suitable binder compositions.

The fired dielectric composition of this invention is processed into a multilayer ceramic capacitor with high dielectric constant between about 4900 and about 5400, low dissipation factors below 2%, and insulation resistance products at 25° C., 50 VDC/mil of greater than 7000 ohm-farads and at 125° C., 50 VDC/mil of greater than 3000 ohm-farads and with stable TC characteristics such that the dielectric constant does not vary by more than plus or minus 15% of the reference value at 25° C.

In another especially preferred embodiment, high purity, barium titanate (99.9 to 99.95% pure) of fine particle size ( 0.8 to 1.3 microns) is stirred in de-ionized water. Cobalt oxide of fine particle size 0.8 to 1.3 microns is added and the mixture is stirred continuously for 30 minutes to 33 hours to ensure adequate mixing of the two reagents. A solution of niobium pentachloride in ethanol is added to the barium titanate/cobalt oxide slurry. The ratio of barium titanate, cobalt oxide and niobium pentachloride is such that the ratio of barium titanate:niobium pentoxide:cobalt oxide in the resulting ceramic composition is 9871:107:22. The resulting slurry is stirred for 10 to 60 minutes and concentrated ammonium hydroxide is added to precipitate hydrous niobium pentoxide. The composite slurry is filtered and washed with deionized water until the washings when tested with silver nitrate/nitric acid solution, show a complete absence of silver chloride precipitate. The washed mixture of ceramic oxides is then dried in a laboratory oven at 110° C. The uniformly blended ceramic composition is then charged into a ball mill together with a binder solution made by uniformly mixing dioctylphthalate "NUOSTABE V-1444 TM",1/ ethanol, toluene and "BUTVAR B-76 TM"2/ vinyl resin. The ratio of ceramic composition to binder is 400:218. The slurry is mixed for 5 to 20 hours, discharged and filtered through a 44 micron screen. This slurry, having a viscosity of about 1500 centipoise, is then de-aired and cast, in accordance with standard techniques, into a tape with a thickness of about 1.5 mils. The tape is converted into a multi-layer ceramic capacitor having 70% paladium/30% silver electrodes via conventional processes well known in the industry. The capacitors are preheated to 260° C. for 48 hours, placed on zirconia setters and sintered at 1280° C. to 1340° C. for 1 to 3 hours. The sintered capacitors have 10 active dielectric layers with dielectric thickness of about 1.1 to about 1.2 mil. Termination electrodes of Dupont TM silver paint number 4822, which is a mixture of silver and glass frit in a binder, are applied at opposite ends of the multi-layer capacitor to connect alternate electrode layers and these capacitors are fired at 815° C. in a tunnel furnace. The resulting multi-layer capacitor has a dielectric constant of approximately 5400 and a dissipation factor of approximately 1.57% measured at 1 KHz at 1 VRMS, and TC characteristics such that the dielectric constant does not vary from its value at 25° C. by more than about ±9.9% between −55° C. and +125° C.

1 "NUOSTABE V-1444 TM" is an alkali ion free organic solvent dispersing agent available from Nuodex Co. Inc., New Jersey.
2 "BUTVAR B-76 TM" is a binder comprising a mixture of polyvinyl butyral, polyvinyl alcohol and polyvinyl acetate available from Monsanto Corp.

The invention will be further illustrated by the following examples, but the invention is not intended to be limited thereto. The values given for the examples herein are subject to variations based on factors known in the art.

EXAMPLE 1

500 g of high purity barium titanate was stirred in 500 g of deionized water. 1.122 g of fine particle size (1.0 micron) cobalt oxide (CoO) was added and stirring continued for 3 hours to ensure adequate mixing of the two reagents. 188.9 mls of a solution containing 28.74 grams per liter of niobium pentachloride in ethanol were added to the barium titanate/cobalt oxide slurry from a burette. The resultant slurry was stirred for 30 minutes and 20 mls of concentrated ammonium hydroxide added from a burette to precipitate hydrous niobium pentoxide. The composite slurry was filtered and washed with deionized water until the washings when tested with silver nitrate/nitric acid solution, showed a complete absence of silver chloride precipitate. The washed mixture of ceramic oxides were then dried in a laboratory oven at 110° C.

400 grams of the uniformly blended ceramic composition was then charged into a ball mill together with 218 grams of a binder solution made by uniformly mixing 186 grams of dioctylphthalate, 90 grams NUOSTABE V-1444 TM , 597 ml of ethanol and 270 mls toluene, and 273 grams of BUTVAR B-76 TM vinyl resin.

This slurry was mixed for 16 hours, discharged and filtered through a 44 micron screen. This slurry having a viscosity of about 1500 centipoise was then de-aired and cast, in accordance with standard techniques, into a tape with a thickness of about 1.5 mils. The tape was converted into a multilayer ceramic capacitor having 70 percent palladium/30 percent silver electrodes via conventional processes well known in the industry. The capacitors were preheated to 260° C. for 48 hours, placed on zirconia setters and sintered at 1280° C. to 1340° C. for 2 hours. The sintered capacitors had 10 active dielectric layers with dielectric thickness of about 1.1-1.2 mil. Termination electrodes of Dupont ™ silver paint No. 4822 which is a mixture of silver and glass frit in a binder, were applied at opposite ends of the multilayer capacitor to connect alternate electrode layers and these capacitors were fired at 815° C. in a tunnel furnace. The capacitance (C), dissipation factor (DF) and capacitance change with temperature versus capacitance at 25° C. were then measured with model ESI 2110A capacitance bridge at 1 KHz measurement frequency, from −55° C. to +125° C. at about 20° C. intervals. Insulation resistance was measured at 25° C. and 125° C. after the capacitor was charged for 2 minutes at 50 VDC using a megaohmmeter M16 ™ manufactured by the London Company, Ontario.

EXAMPLES 2-6

Table 1 shows the weight percent additions of niobium pentoxide and cobalt oxide to barium titanate for a series of compositions prepared according to the method described in example 1 along with a similar series of compositions (A-H) which were prepared by the conventional mixing of 1 micron ceramic powders. In addition, the surface area, expressed as meters squared per gram, and the average particle size (d50), as determined using the Micromeritics Sedigraph ™, are given for both compositional series and illustrate the apparent difference in the physical properties of the compositions prepared by the method described in this invention and by the conventional mixing of 1 micron ceramic oxide particles.

The dielectric properties of these compositions and the composition described in example 1 and shown in Table 2 along with those obtained from a similar series of compositions (A-H) which were prepared by conventional mixing of 1 micron ceramic oxide particles. The results clearly demonstrate the superior performance of compositions prepared by the method described in this invention. Dielectric constants are higher, within the range 4900-5400, dissipation factors are lower, about 1.6% and the RC products are higher, around 7500 ohm-farads.

Table 3 compares the dielectric constant calculated from single plate capacitor measurements with that obtained from multilayer capacitor measurements for both the conventionally mixed compositions and those prepared by the method described in this invention. The results show that the percentage increase in apparent dielectric constant in changing from a single plate configuration to a multi-plate configuration is much greater in the case of those compositions prepared by the method described in this invention, namely +33%-+45%. It is well known in the industry that the dielectric constant calculated by measuring the capacitance of multilayer ceramic capacitors is always greater, by a factor of only about 10-20%, than that calculated by measuring the capacitance of the same ceramic capacitor but in a single plate configuration.

EXAMPLES 7-8

In example 7, 500 g of high purity barium titanate was stirred in a solution of 500 mls of cobalt acetate solution containing the equivalent of 2.1674 gram of cobalt oxide (CoO) per liter of deionized water. Stirring was continued for a further 30 minutes and 30 mls of a solution of oxalic acid dihydrate containing 30.3 g oxalic acid ([CO OH]2 2H2O) per 500 mls of deionized water were added to precipitate cobalt oxalate in a finely divided form. 186.8 mls of a solution of niobium pentachloride in ethanol containing the equivalent of 28.08 grams of niobium pentoxide per liter of deionized water was added to the barium titanate/cobalt oxalate suspension and the mixture stirred for 30 minutes. 20 mls of concentrated ammonium hydroxide was added dropwise to precipitate hydrous niobium pentoxide and the composite slurry was filtered and washed with deionized water until the washings were determined to be free of chloride ions. The washed mixture was then dried in an oven at 110° C.

Multilayer ceramic capacitors were prepared from the composite slurry as described in example 1. The electrical test results are shown in Table 4 along with those obtained for example 8 which was prepared in similar fashion to example 7 except that 500 mls of cobalt acetate solution containing the equivalent of 2.0798 grams cobalt oxide per liter of water was used with 179.25 mls of niobium pentachloride in ethanol solution containing the equivalent of 28.08 grams niobium pentoxide per liter of water.

The electrical results again show that a dielectric constant of greater than 5000 can be obtained by precipitation of the dopants. Also, dissipation factors are below 2% and temperature stability of the dielectric constant is demonstrated over the temperature range −55° C. to ° 125° C. inasmuch as the dielectric constant does not vary by more than plus or minus 15% of its reference value at 25° C.

EXAMPLE 9

500 g of high purity BaCO$_3$ and 202 g of high purity TiO$_2$ were thoroughly mixed and dispersed in about 175 ml of deionized water until a uniformly dispersed slurry was obtained. Up to 4 percent by weight of "DARVAN C ™"3/ may be added to the slurry to help disperse the powder particles. The slurry was then discharged into a drying pan and dried in an oven at about 150° C. with forced air circulation. The dried cake was then pulverized and loaded into a ceramic saggar and calcined at a temperature from about 1900° F. to about 2200° F. for about 1 hour to 5 hours. X-ray diffraction and BaO alkalinity tests on the samples indicated complete reaction and the formation of high purity BaTiO$_3$. The calcined powder was then vibratory energy milled with ZrO$_2$ media until the average particle size was reduced to 1.0 micron. Alternative methods of reducing the size to 1.0 micron might include ball milling or jet milling.

3 "DARVAN C ™" is an alkali ion free aqueous dispersing agent comprising a mixture of polyelectrolytes, ammonia and sulfur available from W.P. Vanderbilt Co., Conn.

500 g of the high purity barium titanate prepared as described above was then mixed with cobalt acetate and niobium pentachloride and processed as described in example 7 to produce a composite mix of the oxides.

Multilayer ceramic capacitors were prepared as described in example 1. The electrical results are shown in Table 5 and are compared with those obtained from conventional mixing of 500 g of the same barium titanate with 1.0 micron cobalt oxide and niobium pentoxide in the same proportions. Once again the results showed a significant improvement in dielectric constant as a result of precipitating the dopant ingredients in a controlled manner in a finely divided form.

TABLE 1

| Example | BaTiO3 | Wt % Nb2O5 | CoO | Ratio Nb2O5/CoO | Wt % Nb2O5 + CoO | Surface Area | d50 |
|---|---|---|---|---|---|---|---|
| 1 | 98.71 | 1.07 | 0.22 | 4.86 | 1.29 | 5.09 | 1.57 |
| 2 | 98.75 | 1.04 | 0.21 | 4.95 | 1.25 | — | — |
| 3 | 98.67 | 1.10 | 0.23 | 4.78 | 1.24 | 5.00 | 1.53 |
| 4 | 98.71 | 1.07 | 0.23 | 4.65 | 1.30 | 5.01 | 1.49 |
| 5 | 98.67 | 1.09 | 0.24 | 4.54 | 1.33 | 5.00 | 1.40 |
| 6 | 98.70 | 1.06 | 0.23 | 4.61 | 1.29 | 4.96 | 1.48 |
| A* | 98.70 | 1.06 | 0.24 | 4.42 | 1.30 | — | — |
| B* | 98.67 | 1.11 | 0.22 | 5.04 | 1.33 | — | — |
| C* | 98.66 | 1.11 | 0.23 | 4.83 | 1.34 | 2.45 | 1.17 |
| D* | 98.74 | 1.03 | 0.23 | 4.48 | 1.26 | 2.99 | 1.07 |
| E* | 98.81 | 1.04 | 0.15 | 6.93 | 1.19 | 3.40 | 0.99 |
| F* | 98.78 | 1.01 | 0.21 | 4.81 | 1.22 | 2.43 | 1.26 |
| G* | 98.76 | 1.04 | 0.20 | 5.20 | 1.24 | 3.27 | 1.04 |
| H* | 98.79 | 1.00 | 0.21 | 4.76 | 1.21 | 2.67 | 1.22 |

*Compositions prepared using conventional mixing processes and approximately 1.0 micron ceramic oxide powders.

TABLE 2

| Example | 1KHz 1VRMS K | DF % | TC(%) at −55° C. | −30° C. | +85° C. | +125° C. | RC 50 VDC at 25° C. | 125° C. |
|---|---|---|---|---|---|---|---|---|
| 1 | 5459 | 1.57 | +9.9 | +8.8 | −8.7 | −3.7 | | |
| 2 | 4963 | 1.75 | +5.5 | +6.8 | −9.9 | −5.0 | 7599 | 3641 |
| 3 | 5072 | 1.55 | +12.9 | +10.2 | −7.7 | −3.3 | | |
| 4 | 5266 | 1.58 | +11.7 | +9.9 | −8.4 | −.29 | | |
| 5 | 5107 | 1.58 | +13.9 | +11.8 | −9.2 | 5.1 | | |
| 6 | 5191 | 1.57 | +10.4 | +9.7 | −10.0 | −6.1 | | |
| A* | 4245 | 1.95 | +2.4 | +3.9 | −8.2 | −1.9 | — | — |
| B* | 4160 | 2.09 | +2.6 | +5.2 | −8.5 | −4.2 | — | — |
| C* | 3948 | 1.83 | +3.2 | +0.9 | −3.0 | +0.6 | 5971 | 2891 |
| D* | 4245 | 1.80 | +5.7 | +6.6 | −8.0 | −5.8 | 5938 | 3083 |
| E* | 4124 | 1.86 | +7.6 | +6.4 | −8.0 | −6.0 | 5727 | 3303 |
| F* | 3969 | 1.89 | +7.2 | +5.4 | −6.0 | +3.3 | 4096 | 1813 |
| G* | 4353 | 2.03 | +1.5 | +3.6 | −8.0 | −5.2 | 4320 | 1920 |
| H* | 4426 | 2.01 | +9.4 | +7.3 | −7.0 | −6.2 | 5144 | 2695 |

TABLE 3

| Example | K Calculated from single plate capacitor K$_{SP}$ | K calculated from multilayer capacitor K$_M$ | $\frac{K_M - K_{SP}}{K_{SP}}$ % |
|---|---|---|---|
| 1 | 3749 | 5459 | +45 |
| 2 | 3724 | 4963 | +33 |
| 3 | 3781 | 5072 | +34 |
| 4 | 3842 | 5266 | +37 |
| 5 | 3782 | 5107 | +35 |
| 6 | 3890 | 5191 | +33 |
| B | 3830 | 4160 | +9 |
| C | 3348 | 3948 | +18 |
| D | 3532 | 4245 | +20 |
| E | 3730 | 4124 | +10 |
| F | 3672 | 3969 | +8 |
| G | 3642 | 4353 | +19 |
| H | 3565 | 4426 | +24 |

TABLE 4

| | Example 7 | Example 8 |
|---|---|---|
| BaTiO3 (wt %) | 98.71 | 98.8 |
| Nb2O5 (wt %) | 1.07 | 0.99 |
| CoO (wt %) | 0.22 | 0.21 |
| Ratio Nb2O5/CoO | 4.86 | 4.71 |
| Wt % Nb2O5 + CoO | 1.29 | 1.20 |
| Surface area m$^2$/g | 5.10 | 5.05 |
| d50 (Sedigraph) | 1.51 | 1.53 |
| K | 5175 | 5093 |
| dF % | 1.59 | 1.61 |
| TC (%) at −55° C. | +9.7 | +10.7 |
| −30° C. | +9.2 | +9.5 |
| +85° C. | −8.4 | −9.5 |
| +125° C. | −5.1 | −6.1 |

TABLE 5

| | Example 9 | Compared with conventionally mixing 1.0 micron powders |
|---|---|---|
| BaTiO3 | 98.71 | 98.71 |
| Nb2O5 (wt %) | 1.07 | 1.07 |
| CoO (wt %) | 0.22 | 0.22 |
| Ratio Nb2O5/CoO | 4.86 | 4.86 |
| Wt % Nb2O5 + CoO | 1.29 | 1.29 |
| Surface area m$^2$/g | 5.05 | 2.68 |
| d50 (Sedigraph) | 1.52 | 1.05 |
| K | 3950 | 3200 |
| dF | 2.1 | 2.3 |
| TC (%) at −55° C. | +5.0% | +4.2% |
| −30° C. | +3.5% | +4.2% |
| +85° C. | −9.7% | −9.8% |
| +125° C. | −7.2% | −1.1% |

EXAMPLES 10-11

In example 10, 500 g of high purity barium titanate and 5.2453 g of fine particles size (1.0 micron) niobium pentoxide was added to 500 ml of cobalt acetate solution containing the equivalent of 2.1674 g of cobalt oxide (CoO) per liter of deionized water and stirred continuously for 3 hours to ensure adequate mixing of the reagents. 30 mls of a solution of oxalic acid containing 30.3 g oxalic acid ([COOH]$_2$.2H$_2$O) per 500 mls of deionized water were added to precipitate cobalt oxalate in a finely divided form. The composite slurry was filtered, washed and dried in an oven at 110° C.

Multilayer ceramic capacitors were prepared from the composite slurry as described in example 1. The electrical test results are shown in Table 6 along with those obtained for example 11 which was prepared in a similar fashion to example 10 except that 500 g of high purity barium titanate and 5.0331 g of fine particle size (1.0 micron) niobium pentoxide were added to 500 mls of cobalt acetate solution containing the equivalent of 2.0798 g of cobalt oxide per 500 mls of deionized water.

TABLE 6

|  | Example 10 | Example 11 |
|---|---|---|
| $BaTiO_3$ (Wt %) | 98.75 | 98.80 |
| $Nb_2O_5$ (Wt %) | 1.04 | 0.99 |
| CoO (Wt %) | 0.21 | 0.21 |
| Ratio $Nb_2O_5$/CoO | 4.84 | 4.84 |
| Wt % $Nb_2O_5$ + CoO | 1.25 | 1.20 |
| Surface area m$^2$/g | 2.92 | 2.94 |
| d50 | 1.52 | 1.52 |
| K | 4372 | 4690 |
| dF % | 1.62 | 1.64 |
| TC (%) at −55° C. | +4.0 | −2.2 |
| −30° C. | +4.5 | +0.7 |
| +85° C. | −7.2 | −10.5 |
| 125° C. | −3.0 | −6.2 |

What is claimed is:

1. A method for making dielectric ceramic having dopant particles uniformly dispersed therein comprising:

dispersing 1 micron diameter major component particles in a liquid medium;

precipitating 0.1 micron diameter particles of a first dopant from a liquid medium containing a precursor of the dopant;

dispersing the first dopant particles throughout the major component particles so that the dopant particles are associated with the major component particles;

dispersing particles of a second dopant, cobalt oxide, throughout the major component particles;

removing the liquid medium; and sintering.

2. The method of claim 1 wherein the liquid medium containing the precursor of the first dopant is added to the liquid medium containing the major component particles; and wherein the first dopant is precipitated in the presence of the major component particles.

3. The method of claim 1 wherein the major component is barium titanate and the first dopant is niobium pentoxide.

4. A method for making a ceramic powder having dopant particles uniformly dispersed therein, comprising the steps of:

(a) preparing a liquid medium including a first dopant;

(b) dispersing major component particles in the liquid medium;

(c) precipitating the first dopant from the liquid medium in the presence of the major component particles so that a substantial portion of the dopant particles are uniformly dispersed about the major component particles; and (d) removing the liquid medium.

5. The method of claim 4 wherein the major component is barium titanate having a particle size of about 1.0 micron and the first dopant is niobium pentoxide having a particle size of about 0.1 microns.

6. The method of claim 4 further comprising the step of sintering the ceramic powder of step (d).

7. The method of claim 4 further comprising the step of dispersing a second dopant about the major component particles.

8. The method of claim 5 wherein barium titanate comprises from about 98.5 to about 98.8 per cent by weight, niobium pentoxide comprises from about 1.0 to about 1.1 per cent by weight, and a second dopant comprising from about 0.2 to about 0.3 per cent by weight of the powder.

9. The method of claim 7 wherein the second dopant is cobalt oxide having a particle size of about 0.1 microns.

* * * * *